Aug. 9, 1966 A. K. OTTO 3,265,302
OVEN SENSER WITH BIASING WINDING
Filed Sept. 26, 1963
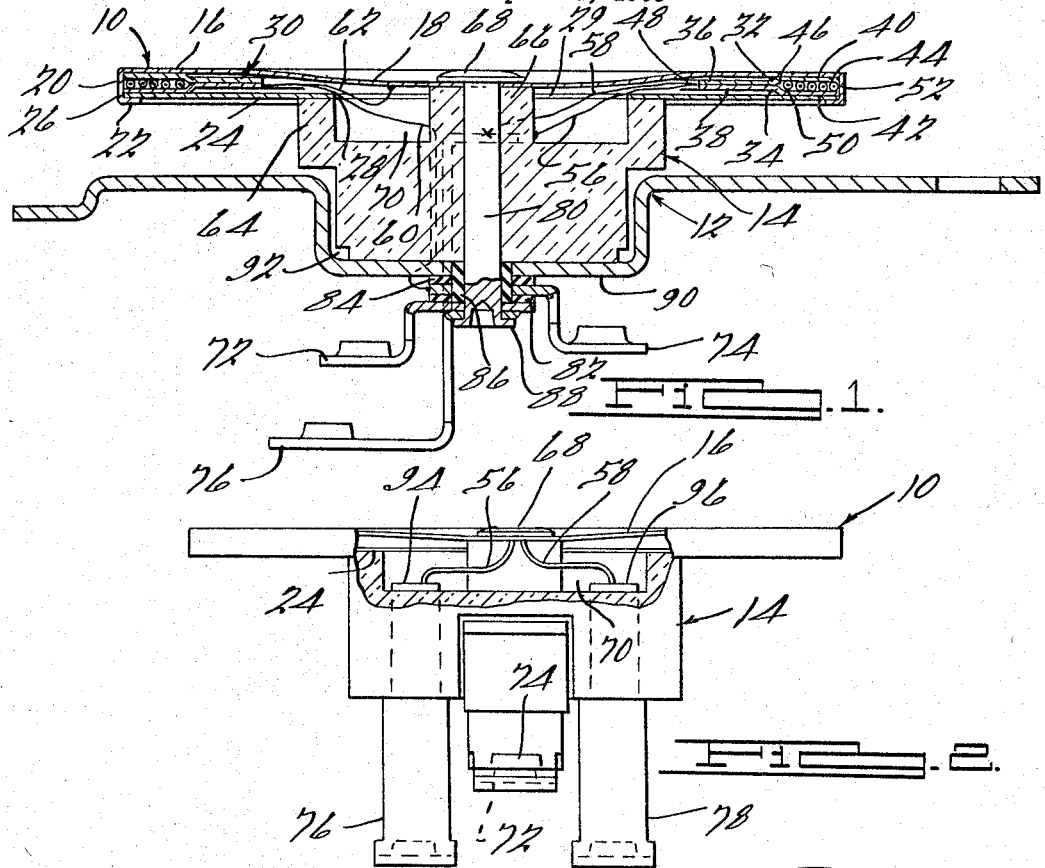
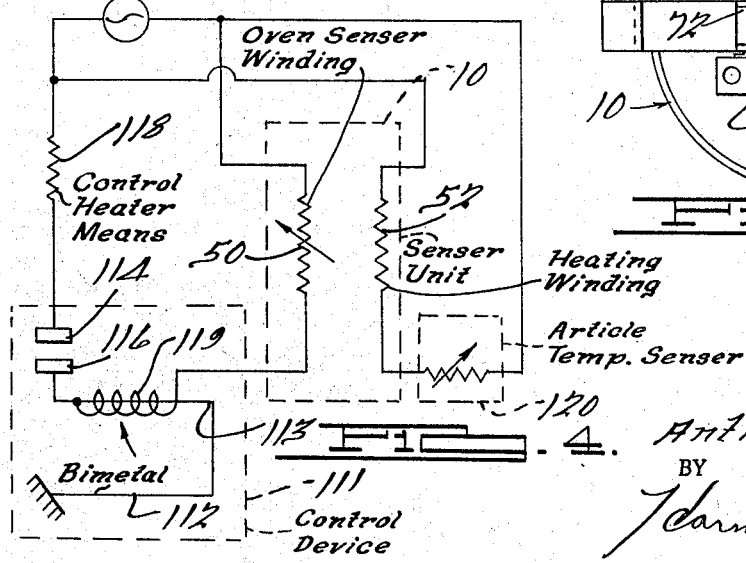
INVENTOR.
Anthony K. Otto
BY
Carness, Dickey & Pierce
ATTORNEYS.

United States Patent Office 3,265,302
Patented August 9, 1966

3,265,302
OVEN SENSER WITH BIASING WINDING
Anthony K. Otto, Ann Arbor, Mich., assignor to King-Seeley Thermos Co., Ann Arbor, Mich., a corporation of Michigan
Filed Sept. 26, 1963, Ser. No. 311,739
3 Claims. (Cl. 236—68)

This invention relates to temperature sensing and control systems for use in a cooking oven, or the like, and more particularly to a temperature senser control therefor.

In cooking of meats or the like having substantial bulk and requiring a finite amount of time to be brought to a desired cooking temperature, it is desirable to operate the oven heat source at a higher temperature setting at the beginning of the cooking operation to provide for fast heating of the roast to the desired cooking temperature. When the roast has reached or as the roast approaches the desired cooking temperature, the temperature setting of the oven heat source must be lowered to maintain both the oven and roast at the exact cooking temperature preferred.

The principles of the invention are illustratively embodied in a senser unit comprising a length of wire having a high temperature coefficient of resistance and supported conveniently in the oven cavity in a location whereat the wire is subjected to temperature conditions of the oven. Changes in oven temperature cause changes in the resistance of the wire which are utilized to control the oven heat source which may be an electrical heating element or a gas flame, or the like. The control system is arranged to anticipate needs for heat changes in the oven and to change the condition of the heat source as necessary to maintain the oven at a preselected temperature from the heat source without wide fluctuations above or below the preselected temperature.

The primary object of the present invention is to provide a new and improved temperature control system in which a temperature sensing device is subjected to the temperature condition of an oven, or the like, and also is subjected to heat from an additional separate heating means.

Another object of the present invention is to provide a temperature sensing pellet having a senser and a heater for the senser.

A further object of the present invention is to provide new and improved means of mounting a temperature sensing unit.

Still another object of the present invention is to provide a new and improved temperature sensing pellet.

A further object of the present invention is to combine a temperature sensing wire having a high coefficient of resistance with a heating winding to control the response of the wire to temperatures applied thereto from a surrounding environment such as an oven.

Other objects and advantages of the present invention will be readily understood by those skilled in the art to which this invention relates by reference to the following detailed description and the accompanying drawing, wherein:

FIGURE 1 is a side elevational view, in section, of a control embodying the inventive principles;

FIGURE 2 is another side elevational view, partly in section, of the control shown in FIGURE 1;

FIGURE 3 is a bottom view of the apparatus shown in FIG. 2; and

FIGURE 4 is a circuit diagram of a control system embodying the inventive principles.

Referring now to the drawing, in general, the control unit comprises a temperature sensing pellet 10 mounted on a support bracket 12 by an insulating block 14. The control unit is adapted to be mounted, for example, at an appropriate position in or adjacent to an oven cavity in a conventional manner.

The temperature sensing pellet 10 comprises upper plate means 16 having a centrally depressed portion 18 and a channel-shaped rim portion 20 including a reversely bent flange portion 22. The pellet 10 may be in the form of a disc and is further defined by lower plate means 24 in the form of an annular ring. Outer peripheral edge 26 is abuttingly received against the rim portion 20 and the inner edge 28 defines a central opening 29.

A senser unit 30 is sandwiched between the upper plate 16 and the lower plate 24 and comprises a pair of annular rings or plates 32, 34 which have inner abutting and fixedly connected flange portions 36, 38 and spaced outer flange portions 40 and 42 which define an annular groove 44. The junction of the spaced plate portions 40, 42 provides a shoulder or hub portion 46. Inner rim portion 48 has a diameter substantially larger than the diameter of the opening 29 and terminates radially outwardly beyond the inner edge 28 of the lower plate. Spaced flange portions 40, 42 are supported in abutting engagement between the upper and lower plate means 16, 24. The senser unit 30 further comprises a plurality of turns of insulated wire 50 having a high temperature coefficient of resistance and preferably wound on the shoulder 46 in abutting engagement with one another in a single layer between flanges 40, 42. For purposes of illustration, the first three turns of wire shown in FIG. 1 may be assumed to be turns of the temperature sensing wire although it is to be understood that any number of turns may be provided as required.

In addition, one or more turns of a heating winding 52 are wound in abutting engagement with an adjacent turn, illustratively shown to be the outer turn, of the sensing wire between the plate flanges 40, 42. Ends 56, 58 of the temperature sensing wire 50 extend radially inwardly between the abutting flanges 36, 38 and between the upper plate 16 and the lower plate 24 for connection to suitable electrical terminals. Similarly, the ends 60, 62 of the heating wire 52 extend radially inwardly between the flanges 36, 38 as shown.

The pellet is supported on the insulating block 14 by a rim portion 64 and a central hub portion 66. Lower plate 24 is abuttingly received on the rim portion 64 and the centrally depressed portion 18 of the upper plate is adapted to seat on the hub 66. A fastening element 68 extends through the upper plate, support block 14, and the bracket 12. As may be seen in FIG. 1, an annular cavity 70 is formed between the rim portion 64 and the hub portion 66. The ends of the wires 56, 58 and 60, 62 are adapted to be received in the annular cavity 70, and connected to a plurality of suitable terminal plates 72, 74, 76, 78. The terminals 72, 74 are mounted on the ends of the shank 80 of the fastener 68 in insulated relationship by a plurality of insulating washers 82, 84. Terminal 72 is electrically connected to the shank 80 and terminal 74 is insulated therefrom by an insulating bushing 86. Wire end 62 may be connected to terminal 72 through the upper plate means and the fastener 68 while wire end 60 is suitably extended through the block 14 and connected to terminal 74. The end of the shank 80 may be peened over as indicated at 88 to fixedly secure the contacts in sandwiched relationship against the bottom 90 of the bracket which provides a well 92 for the block 14. Terminals 76, 78 are fixedly mounted in the insulating block 14 and the upper ends 94, 96 protrude upwardly into the central annular cavity 70 for connection to the lead wires 56, 58.

The control circuit is shown diagrammatically in FIG. 4 and comprises a source of potential 110, senser unit 10, a control device 111, such as a bimetal 112 having a movable leg 113 controlling a pair of contacts 114, 116 to intermittently energize a heating element 118 to maintain a predetermined oven temperature.

FIG. 4 of the drawings symbolically represents heater 118 as a resistor. It is contemplated that in accordance with prior practises, element 118 represents the combination of a heater coil for an oven together with the relay which is customarily used to handle the power required by the heater coil such as in, for example, Hanssen Patent 3,069,524 granted December 18, 1962, and Boddy Patent 2,910,569, granted October 27, 1959, with or without a phase reversal, depending upon selected characteristics of devices 50 and 111, as is discussed in the latter patent. A heating winding 119 may be wound on the leg 113 in a conventional manner. The senser winding 50 and the heating winding 52 are located adjacent one another so that the temperature applied to the senser winding 50 is determined by the condition of the environment being sensed and by the energy state of the winding 52. A senser 120, embodied in a meat probe or the like and adapted to be inserted into an article being heated by the element 118 in the oven to reflect the internal temperature of that article, is controllably connected to the heating winding 52. In this manner, energization of the heating winding 52 is controlled by the senser 120 so that the heat applied to the senser 50 is proportional to the actual temperature condition of the roast, or the like.

Consequently, when a roast is first placed in the oven with the internal temperature of the roast substantially below the temperature at which the oven is set, the senser 120 causes the winding 52 to have a low energy state, for example, by utilization of a senser 120 having a high negative coefficient of resistance. Accordingly, the senser winding 50 is subjected primarily only to the heat in the oven derived from the heating element 118 and maintains the heating element 118 energized at a high rate to bring the oven to a preselected high temperature which may initially actually be above the desired cooking temperature. As the temperature of the meat approaches the desired temperature, the energy state of the senser 120 changes to permit more current to flow to the winding 52 and to subject the senser winding 50 to additional heat which changes its resistance. When, for example, the resistance of winding 52 is increased, the temperature output of the element 118 will be reduced. This change in condition continues until the temperature of the article being cooked or heated, reaches or approaches an equilibrium temperature with its surrounding environment in the oven. Thereafter, the oven is maintained at the desired cooking temperature during the cooking operation.

The inventive principles hereinbefore described, may be alternatively embodied. For example, the senser 10 may have a high negative coefficient of resistance and the senser 120 may have a high positive coefficient of resistance. The particular control circuit with which the sensers are utilized may be varied as desired, and of course, various types of heating apparatus can be utilized in place of the electrical resistance element 118. Therefore, it is intended that the scope of the appended claims be construed to include various alternative embodiments and changes in the details of the control system which utilize the inventive principles disclosed.

The invention claimed is:

1. In an oven temperature sensing and control system for establishing a temperature equilibrium condition between an oven and an article being heated in said oven, bimetal control means having a pair of openable and closeable contacts operable to control the temperature of the oven in accordance with the ratio of open to closed contact time, oven temperature sensing electrical resistance means having a high temperature coefficient of resistance connected in circuit in series with said bimetal control means, said oven temperature sensing electrical resistance means being adapted to be mounted in the oven in heat transfer relationship with the heating environment of the oven and being effective to control the oven temperature, heating wire means mounted in juxtaposition with said oven temperature sensing electrical resistance means for applying a controlled amount of additional heat to said oven temperature sensing electrical resistance means, article temperature sensing means including high temperature coefficient resistance means controllably connected in series circuit with said heating wire means to apply additional heat to said oven temperature sensing electrical resistance means in amounts proportional to changes in temperature of the article and resulting in corresponding change in oven temperature and the oven temperature and the article temperature approaching substantially equilibrium temperature.

2. The invention as defined in claim 1 and wherein said bimetal control means comprises a bimetal element and bimetal heating wire means mounted in heat transfer relationship with said bimetal means and connected in circuit in series with said oven temperature sensing wire means.

3. The invention as defined in claim 2 and having common support means for said oven temperature sensing wire means and said heating wire means mounted in juxtaposition therewith.

References Cited by the Examiner

UNITED STATES PATENTS

| | | | |
|---|---|---|---|
| 2,292,975 | 8/1942 | Spangenberg | 236—68 |
| 2,553,060 | 5/1951 | Miner | 236—68 X |
| 2,556,973 | 6/1951 | Nickells | 338—24 |
| 2,874,260 | 2/1959 | Huppert et al. | 219—504 |
| 2,886,246 | 5/1959 | Gustafsson et al. | 236—68 |
| 2,910,569 | 10/1959 | Boddy | 236—68 X |
| 2,914,644 | 11/1959 | Holtkamp. | |
| 2,980,875 | 4/1961 | Sivacek | 338—25 |
| 3,005,080 | 10/1961 | Bletz. | |
| 3,069,524 | 12/1962 | Hanssen. | |
| 3,070,685 | 12/1962 | Bergsma. | |

ALDEN D. STEWART, *Primary Examiner.*

EDWARD J. MICHAEL, WILLIAM F. O'DEA,
*Examiners.*